No. 650,357. Patented May 22, 1900.
M. W. KIDDER.
ACETYLENE APPARATUS.
(Application filed Aug. 17, 1899.)
(No Model.) 3 Sheets—Sheet 2.
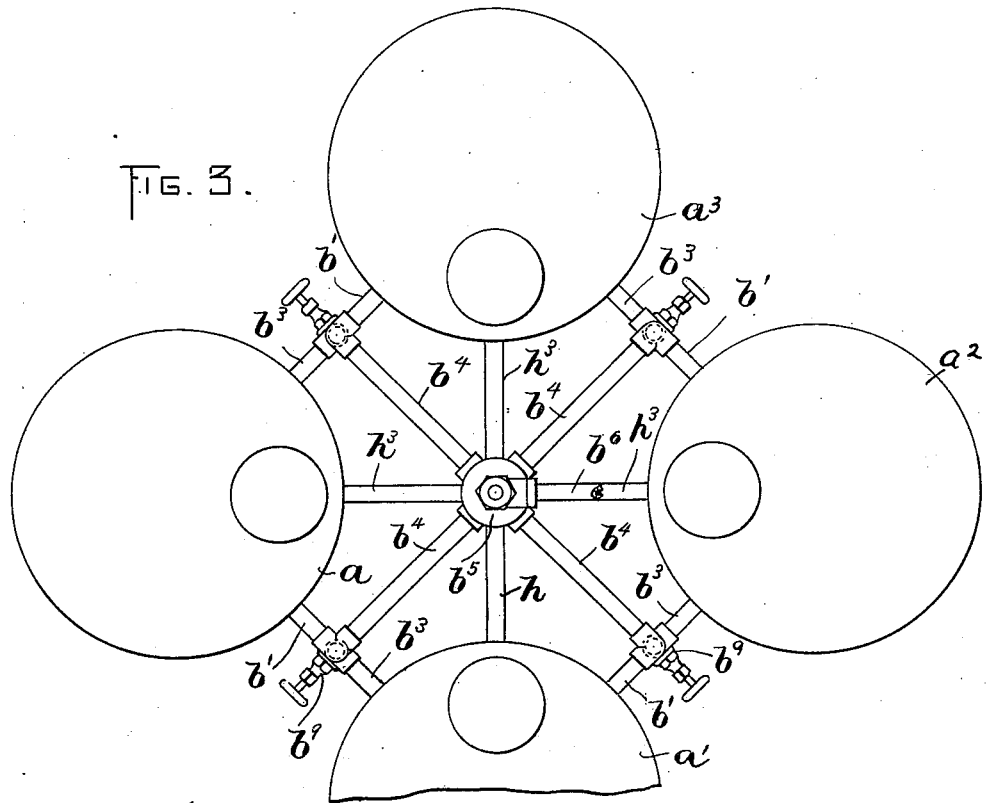
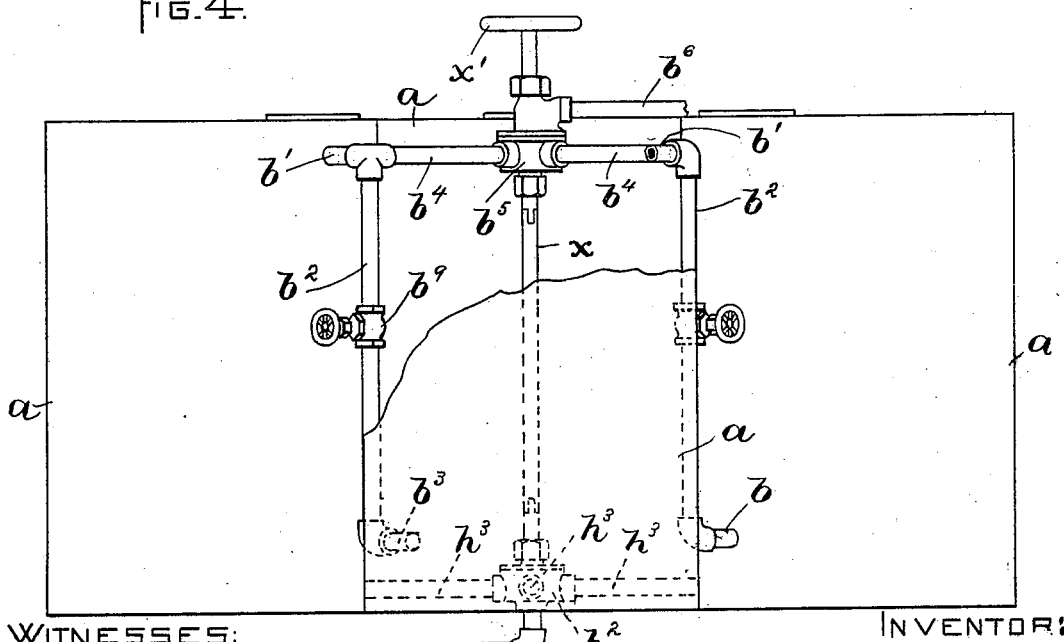
WITNESSES:
E Batchelder
H. L. Robbins
INVENTOR:
Moses W. Kidder
by Wight Brown Quinby
Attys.

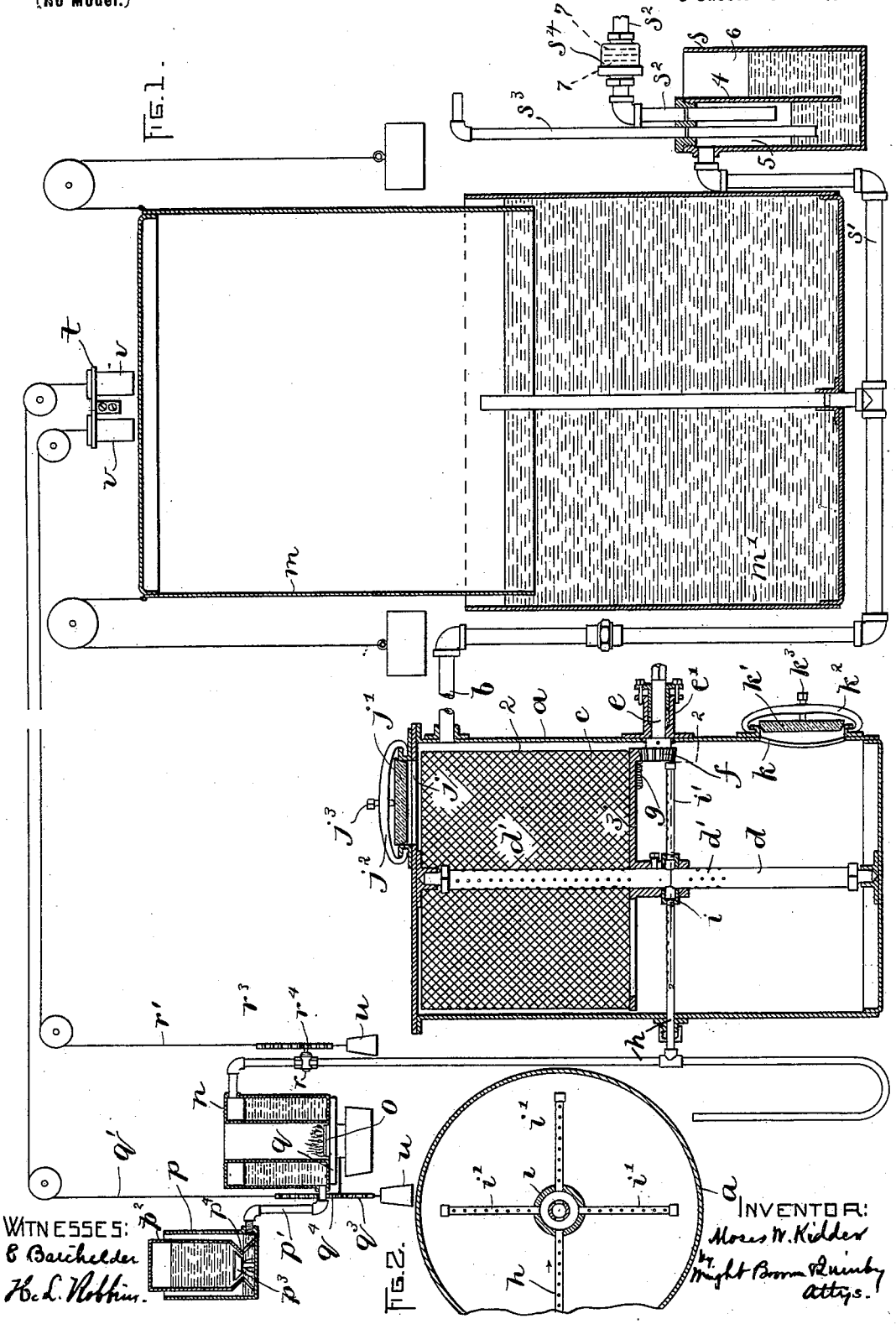

No. 650,357. Patented May 22, 1900.
M. W. KIDDER.
ACETYLENE APPARATUS.
(Application filed Aug. 17, 1899.)
(No Model.) 3 Sheets—Sheet 3.
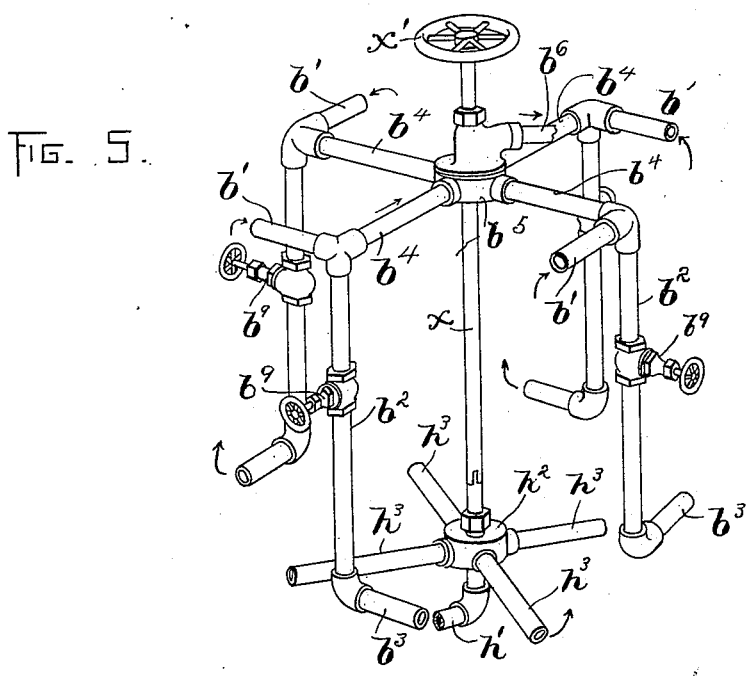
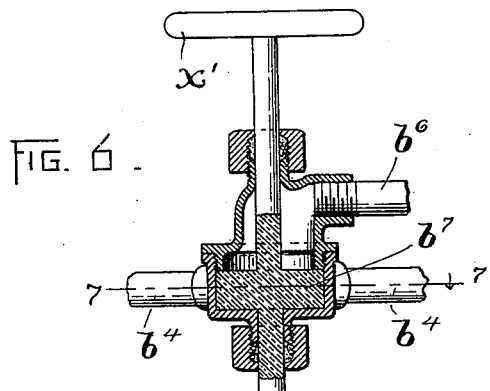
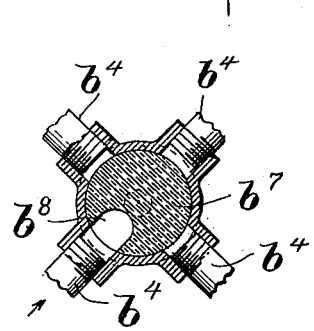
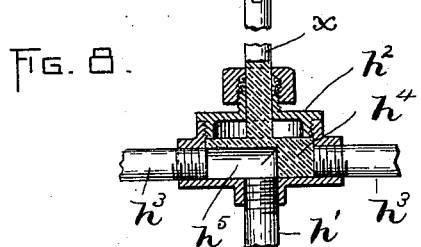
WITNESSES:
E Batchelder
H. L. Robbins
INVENTOR:
Moses W. Kidder
by Wright Brown Quinby
Attys.

UNITED STATES PATENT OFFICE.

MOSES W. KIDDER, OF LINCOLN, MASSACHUSETTS, ASSIGNOR TO PERSON NOYES, OF LOWELL, MASSACHUSETTS.

ACETYLENE APPARATUS.

SPECIFICATION forming part of Letters Patent No. 650,357, dated May 22, 1900.

Application filed August 17, 1899. Serial No. 727,486. (No model.)

*To all whom it may concern:*

Be it known that I, MOSES W. KIDDER, of Lincoln, in the county of Middlesex and State of Massachusetts, have invented certain new and useful Improvements in Acetylene Apparatus, of which the following is a specification.

This invention has for its object to provide a safe, simple, effective, and economical apparatus for generating acetylene gas by the reaction of steam on calcic carbid; and it consists in the improvements which I will now proceed to describe and claim.

Of the accompanying drawings, forming a part of this specification, Figure 1 represents a vertical sectional view of a generator embodying my invention. Fig. 2 represents a section on line 2 2 of Fig. 1. Fig. 3 represents a top plan view of an apparatus comprising a series of the generators shown in Fig. 1. Fig. 4 represents a side elevation of the apparatus shown in Fig. 3. Fig. 5 represents a perspective view illustrating the connections between the series of generators shown in Figs. 3 and 4. Figs. 6, 7, and 8 are sectional views of valves hereinafter referred to.

The same letters and numerals indicate the same parts in all of the figures.

Referring to Fig. 1, $a$ represents a casing which is preferably of cylindrical form and is provided at its upper portion with a gas-outlet $b$, which may communicate with a suitable gas-reservoir $m$, hereinafter referred to.

$c$ represents a carbid-holder which is of reticulated construction to permit the ready escape of the slaked carbid through its bottom and the access of steam to the carbid in the holder, the holder being preferably composed of a cylindrical wall or body 2, of woven wire, and a bottom 3, formed as a grate, with suitable orifices for the escape of slaked carbid. The holder $c$ is located in the upper portion of the casing, the lower portion of the latter constituting a pit or receptacle for the slaked carbid. The holder $c$ is movably supported in the casing, so that it can be shaken or agitated to dislodge the slaked carbid. I prefer to mount the holder so that it can be rotated on a vertical axis and provide means whereby it may be oscillated or partly rotated in opposite directions on said axis. To this end the holder is affixed to a vertical shaft $d$, the ends of which bear in suitable steps on the bottom and top of the casing. A shaking device is employed comprising a shaft $e$, journaled in a gas-tight bearing $e'$ in one side of the casing, said bearing being preferably constructed like an ordinary stuffing-box. The inner end of the shaft is connected with the holder $c$ by means of a gear-wheel $f$, attached to the shaft, and gear-teeth $g$ on the holder, meshing with the wheel $f$, the teeth $g$ being preferably arranged to form a continuous gear extending around the margin of the bottom of the holder. The outer end of the shaft $e$ may be squared to be engaged by a crank or handle, whereby the shaft may be turned to move the holder $c$.

$h$ represents a steam-pipe which admits steam to the casing $a$, the steam reacting on the carbid in the holder $c$. Low-tension or wet steam containing particles of water mechanically suspended is employed and is given access to the carbid in the holder by the foraminous construction of the latter. I prefer to utilize the shaft $d$ as an additional means for introducing the steam into the holder, and to this end I make the shaft hollow and provide it with numerous perforations $d'$, a part of which are below the bottom of the holder and a part above. The steam enters the lower portion of the casing and passes into the shaft through the perforations below the bottom of the holder and into the carbid through the perforations above the said bottom.

$i$ represents a steam-distributer, which is a fixed annular chamber surrounding the shaft $d$ and secured thereto and receiving the pipe $h$, said distributer having suitable perforated outlets $i'$, arranged to distribute the steam. The pipe $h$ may also be perforated, as shown in Fig. 2. The casing is provided in its top with an opening $j$ for the introduction of carbid to the holder $c$ and at its lower portion with an opening $k$ for the removal of the slaked carbid which falls from the holder. Said openings $j$ and $k$ are provided with gas-tight covers $j'$ $k'$. The periphery of each of said covers is preferably a segment of a sphere, so that it may bear closely on its seat, and thus tightly close the opening. Yokes $j^2 j^3$ and screws $k^2 k^3$ secure the covers in place.

In connection with the improved generator above described I show means controlled by the accumulation of gas furnished by the generator for supplying steam to the generator when the volume of the accumulated gas is reduced to a predetermined point and for stopping the supply of steam when the volume is suitably increased.

$m$ represents a floating gas-holder, which is an inverted tank or receptacle having its lower open end immersed in a sealing liquid contained in a tank $m'$, the gas-outlet pipe $b$ entering said tank and delivering the gas to the holder $m$, which rises and falls in the tank.

$n$ represents a steam-boiler which is heated by a burner $o$, the flame from the burner impinging against the boiler and generating steam therein. The burner may be like that of an ordinary kerosene-lamp stove.

$p$ represents a water-reservoir located above the boiler $n$ and communicating therewith through a pipe $p'$, which extends to the lower portion of the boiler. The reservoir $p$ has an inner inverted cup $p^2$, the contracted mouth $p^4$ of which is adapted to supply water automatically to the reservoir $p$, and has a valve $p^3$, which closes when the cup $p^2$ is raised from the reservoir $p$, the whole operating like the oil-reservoir of a German student-lamp.

$q$ represents a heat-regulator, which is here shown as an ordinary wick raising and lowering shaft, and $r$ represents a steam-controlling device or valve adapted to shut off the flow of steam to the casing $a$.

The regulator $q$ and valve $r$ are connected by cords or chains $q'$ $r'$ with the floating gas-holder $m$. The arrangement is such that when the gas-holder is raised above a predetermined point by the accumulation of gas therein the regulator will lower the wick and the valve $r$ will close, thus stopping the supply of steam and the generation of gas. When the gas-holder falls below said point, the regulator raises the wick and the valve $r$ is opened, the generation of steam and gas being then resumed. The chains $q'$ $r'$ are preferably without direct connection with the gas-holder $m$, being connected instead with weights $v$ $v$, which are located above the holder $m$ and rest loosely in sockets formed for their reception in a bracket $t$. To the chains $q'$ $r'$ are attached rack-bars $q^3$ $r^3$, meshing with gear-wheels $q^4$ $r^4$, affixed to the heat-regulator $q$ and valve $r$. Weights $u$ $u$, attached to the rack-bars $q^3$ $r^3$, serve to depress said bars when the weights $v$ $v$ are raised by the gas-holder $m$, the said weights $v$ $v$ being heavier than the weights $u$ $u$, so that when the gas-holder falls the weights $v$ $v$ will fall with it until they rest on the bracket $t$, the weights $v$ $v$ being thus caused to raise the rack-bars $q^3$ $r^3$.

$s$ represents a safety device which comprises a tank or receptacle adapted to hold a sealing liquid, such as water, although a non-congealable liquid or solution will be used in practice. The receptacle is partially subdivided by a partition 4, which extends vertically from the top nearly to the bottom. The portion 5 at one side of the partition is closed at the top and receives the gas-outlet pipe $s'$ from the gas-holder $m$. The portion 6 at the other side of the partition is open at its upper end to the atmosphere. One end of the service-pipe $s^2$ is within the portion 5 and is below the closed top thereof. The gas-pressure normally depresses the liquid in the portion 5, keeping the surface of the liquid below the service-pipe $s^2$, as shown in Fig. 1, the liquid rising in the portion 6. In case the pressure should cease temporarily the liquid is equalized in the two parts 5 6, the liquid rising in the part 5 and covering the lower end of the service-pipe $s^2$, and thus preventing a back flow of air through the pipe $s'$ into the gas-holder, an explosive mixture in the latter being thus prevented.

$s^3$ represents a relief-pipe which extends farther down into the part 5 than the service-pipe $s^2$ and is open to the atmosphere, its lower end being normally sealed by the liquid. In case the gas-pressure becomes excessive it depresses the liquid in the part 5 until it unseals the relief-pipe $s^3$, the excess of gas then escaping through said pipe until the pressure becomes normal, when the liquid rises in the part 5 and seals the relief-pipe.

$s^4$ represents a safety device to prevent combustion in the service-pipe from being communicated to the gas-holder, said device comprising a casing forming an enlargement of the service-pipe and having a series of fine wire-gauze diaphragms 7, which act on the principle of the Davy lamp.

In Fig. 3 I have shown a series of generators similar to that described, the casings $a$ of the series of generators being connected by a system of pipes so arranged that the steam is delivered first to one of the casings and after filling the latter passes on with the gas generated in that casing to the next casing, and so on until all the casings are filled, the gas passing from the last casing of the series to the gas-holder $m$.

The preferred arrangement of pipes connecting the series of tanks is shown in perspective in Fig. 5 and in plan and elevation in Figs. 3 and 4. $h'$ is the steam-supply pipe entering a valve-casing $h^2$, from which radiate a series of branch steam-supply pipes $h^3$, one entering each casing $a$. A valve $h^4$ is contained in said casing and is formed with a port $h^5$, adapted to connect the supply-pipe $h'$ with one, and only one, of the branch pipes $h^3$. Hence steam passes from the pipe $h'$ to only one of the casings $a$, the valve being movable so that either of the casings may be selected to first receive the steam. Each casing $a$ has a gas and steam outlet conduit $b'$ $b^2$ $b^3$ extending from its upper portion to the lower portion of the next casing, so that the gas and steam that escape from the upper portion of each casing pass to the lower portion of the next until the last casing is reached.

The conduit extending from the last casing is connected by a pipe $b^4$ with a valve-casing $b^5$, from which a service-pipe $b^6$ extends to the gas-holder. Each of the said conduits is connected by a pipe $b^4$ with the valve-casing $b^5$, and the casing contains a valve $b^7$, having a port $b^8$, Fig. 7, formed to connect the service-pipe $b^6$ with only one of the conduits at a time, the valve being adjusted so that it permits the passage of gas from the last casing of the series to the service-pipe $b^6$. The valves $b^7$ and $h^4$ may be connected by a rod or spindle $x$, so that both may be adjusted simultaneously, the upper valve $b^7$ having a hand-wheel $x'$, by which the valves may be turned. By thus subdividing the apparatus into a series of sections (each casing $a$ being a section of the apparatus) I am enabled to reduce each charge of carbid to the minimum, thus contributing materially to the safety and economy of the apparatus.

The portion $b^2$ of each conduit is provided with a shut-off valve $b^9$, so that one section can be used alone, if desired.

In Fig. 3, $a$, $a'$, $a^2$, and $a^3$ represent the four sections connected by the pipes, as shown in said figure and in Fig. 5. If valve $h^4$ in the casing $h^2$ is adjusted to let steam into the pipe $h^3$ that leads to section $a$, the other pipes $h^3$ will be inoperative, and the steam will pass through the section or tank $a$ and pass with gas from the upper part thereof through the connections $b'$, $b^2$, and $b^3$, to the section marked $a'$, through which the gas and steam rise, taking up more gas, and then passing in the same way to the section $a^2$, and so on, the mixture passing finally through the section $a^3$ and out through the pipe $b'$, leading therefrom. The valve $b^9$ of this last connection will be closed and the gas will pass through the pipe $b^4$ to the valve-casing $b^5$, the valve in which is adjusted to connect this particular pipe $b^4$ with the service-pipe $b^6$. All the other valves $b^9$ are of course open. If, however, it is desired to use only one tank or section, all the valves $b^9$ are closed and the valves $b^4$ and $b^7$ will be so adjusted that the steam will be admitted to either one of the sections and will pass through the pipe $b'$ of the connection leading from the top of that particular tank or section and through the pipe $b^4$ leading from that connection to the casing $b^5$ and out through the service-pipe $b^6$.

I claim—

1. An acetylene-generator comprising a casing having a carbid-inlet and a gas-outlet, a vertical hollow shaft journaled in the casing, a carbid-holder attached to the shaft and having an open top coinciding with the carbid-inlet, the shaft being perforated both below and above the bottom of the holder, means for moving the carbid-holder to agitate its contents, and means for admitting fluid to the casing, the perforated shaft serving both to support the carbid-holder and to deliver fluid to the interior thereof.

2. An acetylene-generating apparatus comprising a plurality of generators or sections, each having a carbid-holder, a system of conduits arranged substantially as described to connect the sections in series, so that steam and gas may pass from one section to another throughout the series, a steam-inlet and a gas-outlet communicating with the system of conduits, and valves coöperating with said conduits and with the said inlet and outlet, whereby either section may be made the first of the series.

3. An acetylene-generating apparatus comprising a plurality of generators or sections, each having a carbid-holder, a fluid-supply pipe, a valve-casing, such as $h^2$, communicating with said supply-pipe, a plurality of conduits extending from said casing to the generators, a valve in said casing whereby the fluid-pipe may be connected with either conduit and disconnected from the others, a gas-service pipe, such as $b^6$, a valve-casing, such as $b^5$, communicating therewith, connections between said casing and the said conduits, and a valve in the casing $b^5$ adapted to connect the service-pipe $b^6$ with either conduit and disconnect it from the others.

4. An acetylene-generating apparatus comprising a generator, a gas-holder, a sealing-tank outside the gas-holder, partially subdivided into two parts one of which is closed at the top and the other open at its top, the two parts communicating with each other at their lower portions, a gas-outlet pipe connecting the gas-holder with the upper portion of the closed part, a service-pipe extending from the interior of the closed part at a point below the connection of the gas-outlet pipe therewith, and a sealing liquid in said tank, adapted to normally cover the lower end of the service-pipe, whereby the service-pipe is automatically sealed against an inward flow of air in case of a reduction of gas-pressure.

5. An acetylene-generating apparatus comprising a generator, a gas-holder, a sealing-tank outside the gas-holder, partially subdivided into two parts, one of which is closed at the top, and the other open at its top, the two parts communicating with each other at their lower portions, a gas-outlet pipe connecting the gas-holder with the upper portion of the closed part, a service-pipe extending from the interior of the closed part, at a point below the connection of the gas-outlet pipe therewith, a sealing liquid in said tank adapted to normally cover the lower end of the service-pipe, and a relief-pipe extending from a point in the closed part of the tank below the lower end of the service-pipe whereby an excess of gas-pressure is liberated.

6. An acetylene-generating apparatus, comprising a gas-generator having a carbid-holder and a gas-outlet, a steam-boiler connected with the gas-generator, and automatic means actuated by the gas-holder for controlling the generation of steam and the supply thereof to the gas-generator.

7. An acetylene-generating apparatus comprising a gas-generator having a carbid-holder and a gas-outlet, a floating gas-holder connected with said outlet, a steam-boiler connected with the gas-generator, a water-reservoir connected with the boiler, a burner arranged to generate steam in the boiler, and means operated by the floating gas-holder to control the generation of steam in the boiler.

8. An acetylene-generating apparatus comprising a gas-generator having a carbid-holder and a gas-outlet, a floating gas-holder connected with said outlet, a steam-boiler connected with the gas-generator, a heater for said boiler, a heat-regulator for said heater, a valve controlling the admission of steam to the gas-generator, and connections between the gas-holder and the said heat-regulator and valve, whereby the heat is reduced and the supply of steam shut off when the gas-holder rises.

9. An acetylene-generating apparatus comprising a gas-generator having a carbid-holder and a gas-outlet, a floating gas-holder connected with said outlet, a steam-boiler connected with the gas-generator, a heater for said boiler, a heat-regulator for said heater, a valve controlling the admission of steam to the gas-generator, weighted racks connected with said heat-regulator and valve, and means operated by the rise of the gas-holder for permitting a downward movement of said racks.

10. An acetylene-generating apparatus comprising a gas-generator having a carbid-holder and a gas-outlet, a floating gas-holder connected with said outlet, a steam-boiler connected with the gas-generator, a heater for said boiler, a heat-regulator for said heater, a valve controlling the admission of steam to the gas-generator, weighted racks connected with said heat-regulator and valve, weights arranged to be raised by the rise of the gas-holder, and flexible connections between said weights and the weighted racks.

In testimony whereof I have affixed my signature in presence of two witnesses.

MOSES W. KIDDER.

Witnesses:
C. F. BROWN,
E. BATCHELDER.